United States Patent Office 3,113,312
Patented Dec. 3, 1963

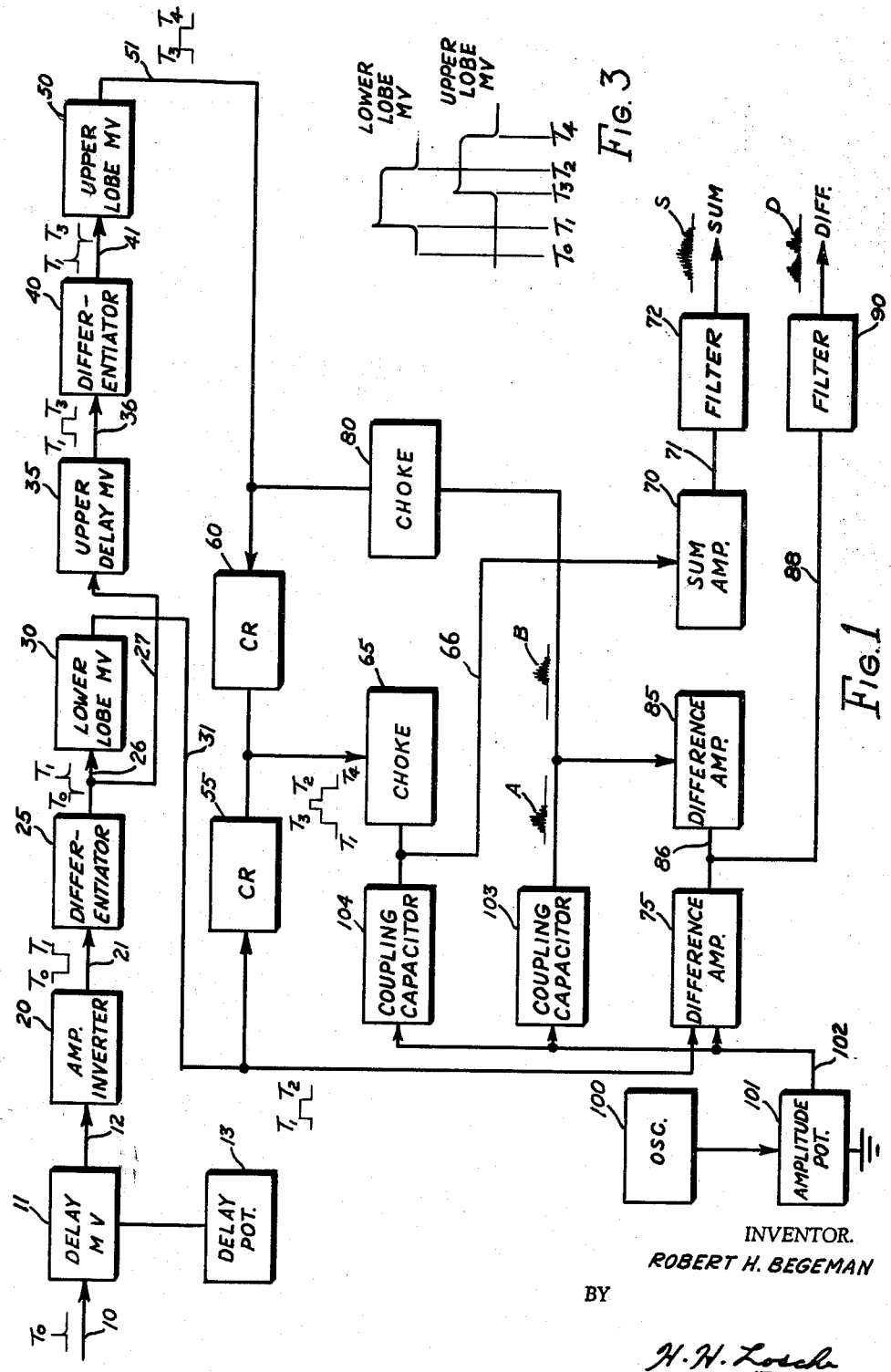

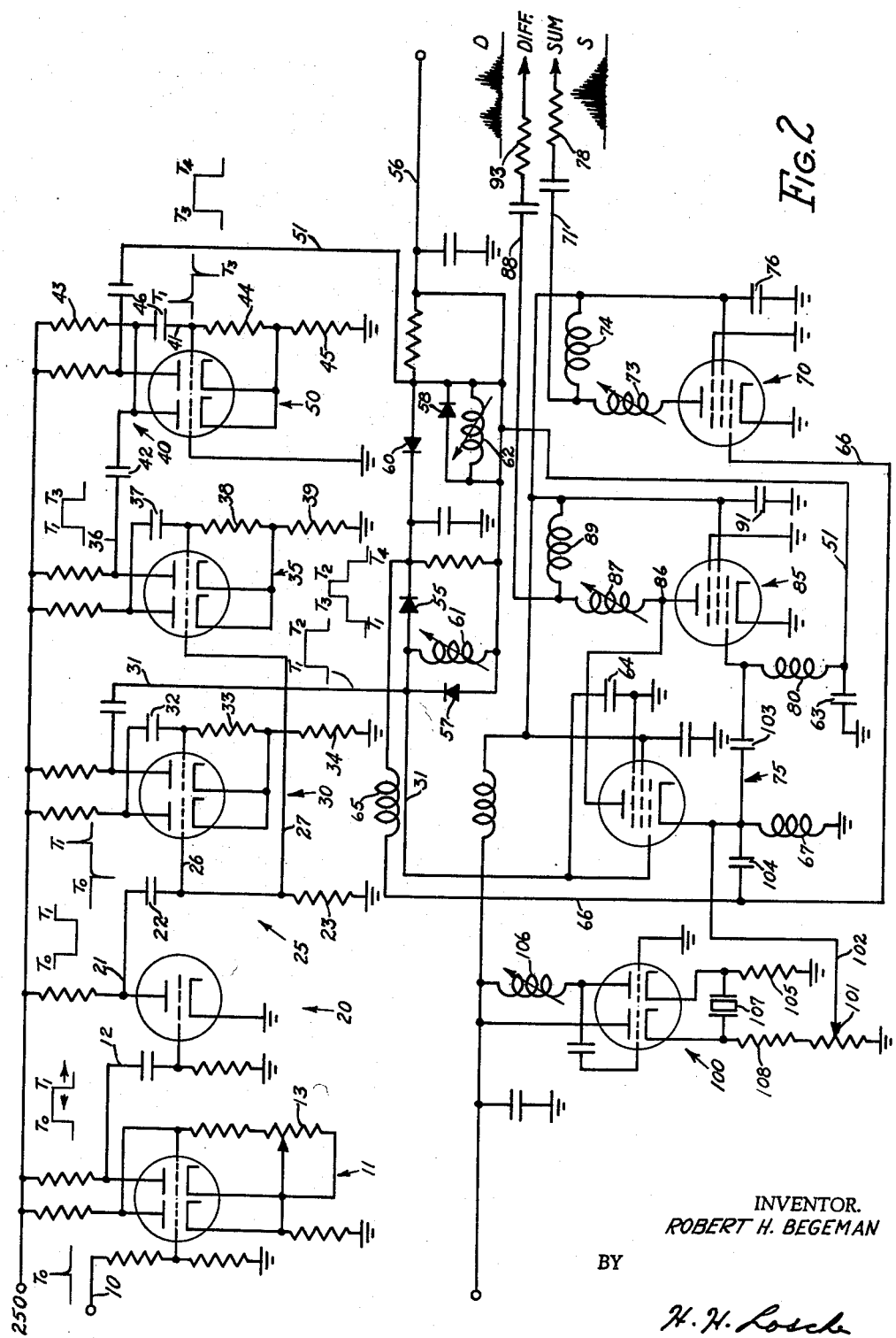

3,113,312
ARTIFICIAL INTERMEDIATE FREQUENCY
TARGET SIMULATOR
Robert H. Begeman, Indianapolis, Ind., assignor to the United States of America as represented by the Secretary of the Navy
Filed Feb. 13, 1959, Ser. No. 793,222
13 Claims. (Cl. 343—17.7)
(Granted under Title 35, U.S. Code (1952), sec. 266)

The invention described herein may be manufactured and used by or for the Government of the United States of America for governmental purposes without the payment of any royalties thereon or therefor.

This invention relates to an artificial intermediate frequency (IF) target simulating means and more particularly to the generation of artificial IF signals simulating target signals by obtaining the sum and difference of generated companion shaped pulses and modulating a carrier frequency therewith for application to a monopulse air-to-ground ranging device to simulate actual operation of the IF amplifiers and the computing circuits in the ranging system.

In radio ranging equipment, and particularly of the radar type, a pulse signal is transmitted into space or toward the ground which will reflect on objects that constitute target objects and the travel time of the pulse signal to and from the target object can be measured to obtain the range of the target object from the pulse signal source. In many well-known ranging devices of this type it is often necessary for checking, testing, or training purposes to set up artificial targets or target signals to simulate an actual target out in space including ground targets. In one known device an artificial signal is transmitted through a closed circuit from a small horn to the antenna of the radar ranging device, the signal from the small horn being adjusted in time occurrence with respect to the corresponding transmitted radar signal to produce a false echo signal simulating a target. In other known devices radar simulator means are coupled to the beam and deflection plate controlling circuits of the radar scope to apply voltages at predetermined adjustable times to produce false or artificial targets on the radar scope. Many such radar range training or testing devices have been provided but will not be discussed in detail herein.

In the preferred form of the present invention a combination of multivibrator circuits is utilized together with differentiator and invertor circuits to produce two pulses, companion lower and upper lobe voltage pulses or waveforms simulating video signals, that occur in close time sequence such that they may be made to overlap slightly. The multivibrator circuit combination is initially triggered by a trigger pulse and the multivibrator circuit has controlling means therein for controlling the position of the developed companion pulses with respect to the initiating or triggering pulse to simulate different range positions of a simulated target. The two developed pulses are applied through radio frequency (RF) filters and shaping networks to a difference circuit and a sum circuit, although the means for developing pulses may at the same time shape the pulses, whereby the sum and difference voltages of the shaped companion pulses may be developed. A crystal controlled oscillator provides oscillations that are mixed with the voltage signals of the sum and difference circuits to provide an IF carrier for the sum and difference voltage or video signals which sum and difference voltage signals are filtered to filter out RF frequency providing these sum and difference voltage signals with capabilities of application to the IF circuitry of a monopulse radar ranging system. The output of the oscillating means is adjustable in amplitude to provide amplitude control of the sum and difference voltage and carrier signals. In the difference circuit one of the lobe pulses produced in the multivibrator circuitry is reproduced out of phase with the sum voltage in the sum circuit and the overlap of the two shaped pulses coming from the multivibrator circuitry will produce a null since the two signals are 180° out of phase and will cancel. The sum and difference modulated voltage signals resulting from this circuitry may be applied to other circuitry, such as for example herein, the IF circuitry of a monopulse radar air-to-ground ranging device to simulate target operation of the radar ranging device. It is therefore a general object of this invention to provide artificial IF signal voltages simulating a target at selected ranges to simulate the actual operation of the IF amplifiers and computing circuits of a radar ranging device, and the like.

These and other objects, advantages, features, and uses may become more apparent to those skilled in the art when described together with the drawings, in which:

FIGURE 1 illustrates a block diagram of the invention with conductors and arrows showing the coupling and direction of information passing through the circuits, FIGURE 2 shows a circuit diagram of the block diagram shown in FIGURE 1; and FIGURE 3 illustrates the lower lobe and upper lobe pulses produced by the multivibrator circuitry in accordance with time sequence from the initial time established by the triggering pulse.

Referring more particularly to FIGURE 1, where a block diagram of the various components coupled in operative relationship is illustrated, an input circuit, indicated by the conductor 10 over which triggering pulses are applied as shown above the conductor by the triggering pulse $T_0$, is coupled to a delay multivibrator 11 to produce positive square waves on an output conductor 12 thereof. The delay multivibrator 11 has a control potentiometer 13 therein for adjusting the time occurrence $T_1$ of the trailing edge of the positive square wave conducted over the output conductor 12. The adjusted positive square wave $T_0T_1$ is applied through an amplifier inverter 20 producing a negative square wave over the output lead 21 for application to a differentiating network 25. The differentiating network produces a negative spike $T_0$ and a positive spike $T_1$ on the outputs 26 and 27 coupled in common to a lower lobe multivibrator circuit 30 and an upper delay multivibrator circuit 35. The upper delay multivibrator 35 utilizes only the positive spike $T_1$ for triggering same to produce a positive square wave on the output 36 thereof having the time relations $T_1$ and $T_3$. The positive square wave $T_1T_3$ is differentiated in a differentiating circuit 40 to produce the positive and negative spikes $T_1$ and $T_3$ on the output 41 which is applied to an upper lobe multivibrator circuit 50. The upper lobe multivibrator circuit utilizes only the negative spike $T_3$ to produce a positive square wave having a time relation of $T_3T_4$ on the output 51 thereof.

The lower lobe multivibrator circuit 30 produces a positive square wave having the time relation $T_1T_2$ on the output 31 which square wave is applied through a crystal rectifier 55, and the positive square wave $T_3T_4$ coming by way of the conductor 51 is applied through a crystal rectifier 60 to be summed in a choke coil 65. The summed output from the choke 65 is applied through a conductor means 66 to a sum amplifier circuit 70 for the purpose to be described to greater detail later.

The lower lobe square wave on the output conductor 31 of the lower lobe multivibrator circuit 30 is applied also to a difference circuit having two circuit components, one circuit component being illustrated herein as a difference amplifier 75. The upper lobe square wave is applied also by way of the output conductor 51 of the upper lobe multivibrator 50 through a choke 80 to the other difference circuit component illustrated as a difference amplifier 85. The difference amplifiers 75 and 85 have a common output coupling 86 which conducts the difference voltage signals to the difference output through an RF filter 90 although these voltage signals are on a carrier wave as will presently be described.

In order to provide an IF carrier for the sum and difference voltage signals, a crystal controlled oscillator 100 having an amplitude potentiometer 101 coupled therein provides over the output 102 through the coupling capacitors 103 and 104 the carrier wave to the sum circuit by way of the conductor 66 and to the difference circuit by way of the coupling capacitor 103 and the difference amplifier 75. The oscillator 100 thereby provides the carrier oscillations modulated by the sum and difference voltage signals as shown by A and B, and S and D, adjacent the respective conductors in this figure. The envelope of the voltage signals A, B, S, and D, are rounded off or shaped in curves as provided by smoothing choke coils and capacitors which will hereinafter be made more clear in the detailed circuit description of FIGURE 2. Likewise the sum of the square wave voltage signals produced by the lower lobe and upper lobe multivibrators, as represented in waveform over the choke 65, is smoothed prior to this choke but is herein shown as step voltages $T_1$, $T_3$, $T_2$, and $T_4$ for clarity in the operation of summing these two square voltage waves. The smoothing of this summed voltage wave will be made clear in the description of FIGURE 2.

Referring more particularly to FIGURE 2, the triggering pulse $T_0$ is applied by way of conductor 10 through a resistance circuit to the grid of the first triode section of a double triode in the delay multivibrator circuit 11 in which the right triode section is normally conducting and the left triode section is cut off. The cathodes of the double triode are coupled in common and biased by the delay potentiometer 13 to adjust the time delay of the trailing edge of the positive square wave taken from the anode of the second section of the double triode and conducted on the output conductor 12 to the grid of an inverter amplifier triode tube circuit 20. The inverted square wave $T_0T_1$ is applied from the anode of the inverter tube circuit by way of the output conductor 21 to the differentiating network 25 provided by a capacitor 22 and a resistance 23, and this differentiated wave is applied to the grid of a first triode section of a double triode in the lower lobe multivibrator circuit 30 and to the grid of a first triode section of a double triode in the upper delay multivibrator circuit 35 by way of the conductors 26 and 27, respectively. The double triode tube of the lower lobe multivibrator circuit 30 is normally conducting in the right triode section and the left triode section is cut off. Since the negative spike $T_0$ of the differentiated wave applied to the grid by conductor 26 is incapable of switching the conduction of this tube in the lower lobe multivibrator circuit 30, the negative spike $T_0$ will be ignored and this double triode tube will not be switched until the positive spike $T_1$ causes conduction in the left triode section and cut-off of the right triode section of this tube. The circuit constants established by a capacitor 32 and resistances 33 and 34 determine the conduction time of the left triode section to establish the positive square wave $T_1T_2$ on the output conductor 31 of this lower lobe multivibrator circuit 30. The time duration of this positive square wave will be $T_2-T_1$. It is to be understood that the trailing edge $T_2$ could be made to vary in duration by making one of the time constant elements 32, 33, or 34, variable in a manner well known by those skilled in the art.

The differentiated wave $T_0T_1$ coming from the differentiator circuit 25 by way of the conductor 27 and applied to the grid of the left triode section of the upper delay multivibrator circuit 35 in like manner produces no interruption in the normal conduction of the right triode section of this tube during the application of the negative spike $T_0$. Upon the application of the positive spike $T_1$ to the grid of the left triode section of the double triode tube in the upper delay multivibrator circuit 35, conduction is caused to switch from the right triode section to the left triode section for a period of time determined by the capacitor and resistance elements 37, 38, and 39. The time constant set up by the latter elements provides a positive square wave on the anode of the right triode section corresponding in time to $T_1$ and $T_3$ as shown above the output conductor 36. The anode of the right triode section of the double triode tube in the upper delay multivibrator circuit 35 is capacitor coupled by conductor 36 to the anode of the left triode tube section of a double triode in the upper lobe multivibrator circuit 50. This positive square wave $T_1T_3$ is likewise applied through the differentiating network 40 consisting of the coupling capacitor 42 and a resistance 43 to the grid of the right triode section by way of the conductor 41. The output of the upper lobe multivibrator circuit 50 is taken from the anode of the right triode section by the conductor 51. By this circuit arrangement of the upper lobe multivibrator circuit, the normal conduction of the right triode section of this double triode tube is undisturbed by the positive spike $T_1$ of the differentiated wave applied by way of conductor 41, but upon the application of the negative spike $T_3$ to the grid of the right triode section of the double triode tube, conduction will be switched from the right triode tube section to the left triode tube section to develop a positive square wave on the anode of the right triode section originating at a time $T_3$ and terminating at a time $T_4$ in accordance with the time constants established by a capacitor 46 and resistors 44 and 45. Where desirable, the recovery time of the upper lobe multivibrator could be made adjustable to vary the $T_4$ duration time by varying one of the time constant elements.

The positive square wave $T_1T_2$ coming by way of the conductor 31 from the lower lobe multivibrator circuit 30 is applied through the crystal rectifier 55, and the positive square wave $T_3T_4$ coming by way of the conductor 51 is applied through the crystal rectifier 60 to be summed at the common junction of the cathodes of these crystal rectifiers. The square voltage wave $T_1T_2$ applied by way of the conductor 31 to the crystal rectifier 55 is smoothed or shaped by the inductance coil 61 and the capacitor 64 combination, and the square voltage wave $T_3T_4$ coming by way of the conductor 51 to the crystal rectifier 60 is smoothed or shaped by the inductance 62 and the capacitor 63 in combination. The shaped voltage waves passed by the crystal rectifiers 55 and 60 are added in the common cathode junction and applied through the choke coil 65 over the conductor 66 to a sum amplifier circuit soon to be described. To avoid negative swings of the lower lobe and upper lobe voltage waves being applied through the crystal rectifiers 55 and 60, diodes, such as 57 and 58, are oriented in the diode coupling in opposition to the rectifiers 55 and 60. The inductance coils 61 and 62 are made variable to vary the length and shape of the upper and lower lobe voltages. The squared voltage waveform $T_1T_3T_2T_4$ shown at the common cathode junction of the crystal rectifiers 55 and 56, is exaggerated to show the summing operation although in actual practice this waveform will amount to a curve as a result of the smoothing or shaping of the square voltage waves applied by the conductors 31 and 51.

The summed voltage of the shaped upper and lower voltage lobes conducted through the choke coil 65 is transmitted by way of conductor 66 to the grid of a sum amplifier pentode tube in the sum amplifier circuit 70. The sum amplifier circuit is biased by a D.C. voltage applied over conductor 56. The sum voltage conducted by the conductor 66 is blocked from the difference circuits 75 and 85 by the capacitor 104 and the coil 67, this capacitor having sufficiently high impedance to block the shaped sum voltage or video signals but of a capacity to pass IF and RF signals. The sum voltage therefore is only applied to the sum amplifier circuit 70 and the modulated sum voltage is conducted through a variable inductance 73 to the output lead 71. The variable inductance 73 is adjustable to match the impedance of this circuit with the output circuit coupled to the conductor 71. The output circuit 71 effectively passes the IF frequency by the elements 73, 78, and tube output capacitance which constitutes the filter 72 in FIGURE 1. The modulated voltage signal on the output 71 is represented by the voltage envelope below the output conductor 71. The voltage envelope S shows a carrier frequency modulated by the sum voltage signal, the incorporation of this carrier frequency in the voltage envelope S of which will soon be described.

The difference circuits represented in FIGURE 1 are shown as difference amplifier circuits 75 and 85 in FIGURE 2 each of which includes a pentode tube having their anodes coupled in common. The lower lobe voltage wave $T_1T_2$ coming by way of the conductor 31 and shaped by the variable inductance 61 and the capacitor 64 is coupled to the control grid of the pentode in the difference amplifier circuit 75. The upper lobe voltage wave $T_3T_4$ conducted by way of 51 and smoothed by the variable inductance 62 and capacitor 63 is applied through an inductance 80 to the control grid of the pentode in the difference amplifier circuit 85. A capacitor 103 coupled between the cathode of the pentode in the circuit 75 and the control grid of the pentode in the circuit 85 blocks any application of these video shaped signals from the cathode of the pentode in the circuit 75. The control grid and the suppressor grid in the pentode of the difference amplifier circuit 75 are capacitor coupled while the suppressor grid of the pentode in the difference amplifier circuit 85 is grounded. The anode coupling of the pentodes in the difference amplifier circuits 75 and 85 are connected from a point 86 through a variable inductance 87 to the output circuit 88 constituting the difference voltage output of the upper and lower lobe voltages although this voltage output is actually a modulating voltage as will be made clear hereinbelow. The variable inductance 87, like the variable inductance 73, may be used to match the output circuit impedance for the system. Elements 87, 93, and tube output capacitance provide a filter circuit illustrated as the block 90 in FIGURE 1.

The crystal oscillator 100, shown herein as being a double triode tube, has the anode of the left triode section coupled directly to a voltage supply and the anode of the right triode section coupled through a variable inductance 106 for adjusting the generated oscillations. The cathodes of the double triode tube have a crystal 107 coupled thereacross to stabilize the oscillations, the cathode of the left triode section being coupled to ground through a fixed resistance 108 and the resistance of the potentiometer 101 while the cathode of the right triode section is coupled to ground through a resistance 105. The movable tap of the potentiometer 101 is coupled by way of conductor 102 to the cathode of the pentode tube in the difference amplifier circuit 75 applying the generated oscillations to the cathode of this tube. The oscillator circuit 100 is designed for this particular purpose to generate a frequency in the order of about 45 megacycles although other frequencies in the intermediate frequency band may be used, if desired. Since the capacitors 103 and 104 are designed to pass the 45 megacycle frequency of the oscillator 100, the 45 megacycle frequency will be applied over the conductor 66 to the control grid in the pentode of the sum amplifier 70 as well as to the control grid of the pentode in the difference amplifier circuit 85. The difference amplifier tube circuits 75 and 85 resemble a balanced modulator circuit in which the modulating frequency is applied to the cathode of one and the control grid of the other to gate these tubes and to cause the pentode in the difference amplifier circuit 75 to produce anode voltages of the lower lobe voltage signal out of phase with the anode voltage produced by the upper lobe voltage signal applied to the difference amplifier circuit 85. The difference amplifier circuits 75 and 85 are biased by a negative voltage applied by way of conductor 56 which, together with the frequency applied by the oscillator 100, gate the two difference amplifier circuits 75 and 85 to produce the modulated difference voltage at the common anode junction 86. By this circuit arrangement the anode voltage of the pentode in the difference amplifier circuit 75 is out of phase with the sum voltage on the anode of the pentode of the sum amplifier circuit 70 while the anode output of the pentode in the difference amplifier circuit 85 is in phase with this sum voltage. The modulated difference voltage is shown by the envelope D above the difference output conductor 88, this envelope showing the carrier frequency thereon in like manner as the sum envelop S. The sum and difference outputs by way of conductors 71 and 88 provide IF sum and difference voltages for application to air-to-ground monopulse radar devices to simulate actual operation of the IF amplifiers and computer circuits of the radar system.

Since the structure and functions of this simulating circuitry shown by FIGURES 1 and 2 were explained in detail in the description of these two figures, it is believed that the operation of the device is apparent from the above description. For each triggering pulse $T_0$ applied by way of the conductor 10 two square wave voltages are produced, the first being the positive square wave $T_1T_2$ on the output 31 of the lower lobe multivibrator circuit and the second being the positive square wave $T_3T_4$ on the output conductor 51 of the upper lobe multivibrator circuit 50. These two voltage waves are produced in time sequence as shown in FIGURE 3 wherein there is produced a slight overlap of the trailing edge of the lower lobe voltage wave with the leading edge of the upper lobe voltage wave as represented in time by $T_2$ and $T_3$ in FIGURE 3. This slight overlap is intended to produce a crossover point in the sum and difference circuit for producing clearly defined sum and difference voltages in the modulating process for simulating IF frequency voltage signals of radar targets. For each triggering pulse $T_0$ corresponding sum and difference modulated voltages S and D are provided on the output circuits 71 and 88 for application to the input of the IF circuitry of air-to-ground monopulse radar systems or other means of use as desired.

While many modifications and changes may be made in the constructional details and features of this invention, it is to be understod that I desire to be limited only in the scope of the appended claims. Such modifications may be in the elimination of the upper delay multivibrator 35 and the use of shaping circuits to shape the $T_1T_2$ and the $T_3T_4$ voltage waves for the sum and difference circuits. Further, phase shifted sine wave generators could be substituted for the multivibrator and differentiator combination circuits to produce overlapping sine voltage waves capable of producing multiple simulated targets. In the latter modification shaping circuits would not be needed and modulation of a carrier by the sum voltage may be carried out without the pentode tube circuit disclosed. Also, there can be other means of changing the phase in the difference amplifier circuits 75 and 85 as by altering or changing balanced modulator circuits or by using the simple triode tube for phase reversal of one of the voltage lobes. Such substitutions of components are considered as coming within the skill of a mechanic in this art, the understanding of which is clear without specific illustration. While this invention has been described with reference to radio ranging devices and particularly to radar air-to-ground ranging devices as examples of use, it is to be understood that the invention described herein is for the purpose of illustrating and describing a preferred form of the invention without limitation as to various modifications and embodiments as hereinabove mentioned and that I desire to be limited only by the scope of the appended claims.

I claim:

1. An intermediate frequency target simulating means comprising: a triggering input circuit; electronic means coupled to said triggering input circuit for producing two shaped voltage pulses; means controllable in said electronic means to vary the two shaped voltage pulses in time duration with respect to each trigger; means coupled to said electronic means for combining said shaped voltage pulses; means coupled to said combining means for producing a carrier for said voltage pulses; phasing means coupled to receive one of said voltage pulses for reproducing said voltage pulse 180° out of phase with the other voltage pulse; means coupled to said phasing means and said one of said voltage pulses for producing a difference voltage on an output thereof; and summing means coupled to said combining means for summing said two voltage pulses on an output thereof whereby said output voltages simulate target voltages adjustable in time occurrence to simulate target range.

2. An intermediate frequency target simulating means comprising: a triggering input circuit; a multivibrator means coupled to said triggering input circuit and having a control to adjust the time duration of an output pulse; first means coupled to said multivibrator means responsive to said output pulse to produce a first pulse originating at the trailing edge of said output pulse; second means coupled to said multivibrator means responsive to said output pulse to produce a second pulse originating at the trailing edge of said output pulse; third means coupled to said second means to develop a third pulse originating at the trailing edge of said second pulse; means coupled to said first and third means for obtaining the sum and difference voltages of said first pulse and said third pulse and for conducting each over output conductors; and means for providing a carrier voltage for said sum and difference voltages whereby said sum and difference voltages may be utilized as intermediate frequency target voltage simulated signals.

3. An intermediate frequency target simulating means as set forth in claim 2 wherein said first, second, and third means are multivibrators, the first and second means having a differentiator means in common and the third means having a differentiator means therein wherein the differentiated trailing edge of developed pulses are selected for use in producing said first and third pulses.

4. An intermediate frequency target simulating means as set forth in claim 3 wherein said first and third multivibrators produce lower and upper lobe pulses constituting said first and third pulses, respectively, from which said sum and difference voltages are obtained and said second multivibrator is a delay multivibrator which produces said second pulse having the trailing edge delayed a predetermined period of time from the leading edge thereof.

5. An intermediate frequency target simulating means as set forth in claim 4 wherein said means coupled to said first and third multivibrators to receive said upper and lower lobe pulses to obtain difference voltages includes two grid controlled vacuum tubes, said upper and lower lobe pulses being coupled respectively to the grids of said two vacuum tubes and said carrier voltage is applied to the grid and cathode of said two vacuum tubes to produce out-of-phase pulses on the anode outputs of said tubes thereby obtaining a difference voltage therefrom.

6. An intermediate frequency target simulating circuit comprising: a delay multivibrator circuit adapted to be triggered by triggering pulses for developing a first square voltage wave on an output thereof for each triggering pulse, said multivibrator circuit including adjustable means to adjust the time occurrence of the trailing edge of said first square voltage wave; first differentiating means coupled to the output of said delay multivibrator circuit to produce a first differentiated pulse for each first square voltage wave on an output thereof; a lower lobe multivibrator and an upper delay multivibrator coupled in parallel to the output of said first differentiating means, said multivibrators each developing a second square voltage wave and upper delay square voltage wave on the respective outputs thereof originating in time from the differentiated trailing edge pulse of said first square voltage wave; second differentiating means coupled to said upper delay multivibrator output to produce second differentiated pulses of each upper delay square voltage wave; an upper lobe multivibrator coupled to said second differentiating means output for producing a third square voltage wave on the output thereof originating at the differentiated trailing edge of each upper delay square voltage wave; a difference means coupled through a shaping network to receive the second and third shaped voltage waves and to provide a difference voltage on an output thereof; a summing means coupled through said shaping network to receive the second and third shaped voltage waves and to provide a sum voltage on an output thereof; and means for providing a carrier voltage for said sum and difference voltages to provide modulated sum and difference voltages whereby said modulated sum and difference voltages simulate intermediate frequency target signals.

7. An intermediate frequency target simulating circuit as set forth in claim 6 wherein said difference means includes a pair of grid controlled vacuum amplifier tubes in which said second and third shaped voltage waves are applied to the grids of said vacuum amplifier tubes and said carrier voltage is applied to said cathode and grid respectively thereby producing out-of-phase pulse amplifications on the anodes coupled in common of said pair of tubes resulting in said modulated difference voltage.

8. An intermediate frequency target simulating circuit as set forth in claim 7 wherein said second and third shaped voltage waves are applied to said pair of amplifier tubes through radio frequency filters.

9. An intermediate frequency target simulating circuit as set forth in claim 8 wherein said first and second differentiators and said lower and upper lobe multivibrators are constructed and arranged with time constants to produce said second and third square voltage waves to have the trailing edge of the second square wave occur after the occurrence of the leading edge of said third square voltage wave.

10. An intermediate frequency target simulating circuit comprising: an input circuit for conducting input triggering pulses therein; a multivibrator and differentiating circuit combination constructed and arranged to develop two companion, positive going, substantially square voltage waves on two separate outputs, said square voltage waves being developed in time sequence with the trailing edge of one square voltage wave occurring slightly after the leading edge of the other voltage wave and being adjustable in unison with respect to their initiating triggering pulse; a shaping circuit coupled to receive said two companion square voltage waves to shape same; a difference circuit coupled to receive said two companion shaped voltage waves, said difference circuit including means to reproduce one of said companion shaped voltage waves out of phase with the other said companion shaped voltage waves, the difference circuit producing a difference voltage signal for said two companion shaped voltage waves on an output thereof; a sum circuit coupled to receive said two companion shaped voltage waves for summing the voltage thereof and producing the summed voltage signal on an output thereof; and means coupled to said difference and sum circuits for applying a signal carrier for said difference and sum voltages whereby said difference and sum voltage signals simulate intermediate frequency target signals adjustable in time by said means adjusting in unison the two companion voltage waves for simulating target range.

11. An intermediate frequency target simulating circuit as set forth in claim 10 wherein said difference circuit includes a pair of grid controlled vacuum tubes having one each of said two companion shaped voltage waves coupled to be applied to the grids respectively, and said signal carrier is coupled to the cathode and grid respectively of said pair of vacuum tubes providing said means to reproduce one of said companion shaped voltage waves out of phase with the other of said companion shaped voltage waves on the anodes of said pair of vacuum tubes as modulated difference voltages, the anodes of said pair of vacuum tubes being coupled in common to provide said difference circuit output on which said modulated difference voltage signals are produced.

12. An intermediate frequency target simulating circuit as set forth in claim 11 wherein said sum circuit includes a grid controlled vacuum tube receiving said summed companion shaped voltage waves and said carrier frequency on the grid thereof, and the anode thereof provides said sum output voltage as a modulated sum voltage.

13. An intermediate frequency target simulating circuit as set forth in claim 12 wherein said couplings to receive said two companion shaped voltages waves in said difference and sum circuits include filters to filter out radio frequency.

No references cited.